July 8, 1924.  1,500,751
B. H. HOWARD ET AL
FEEDER FOR INGOT MOLDS
Filed Feb. 15, 1924   2 Sheets-Sheet 1
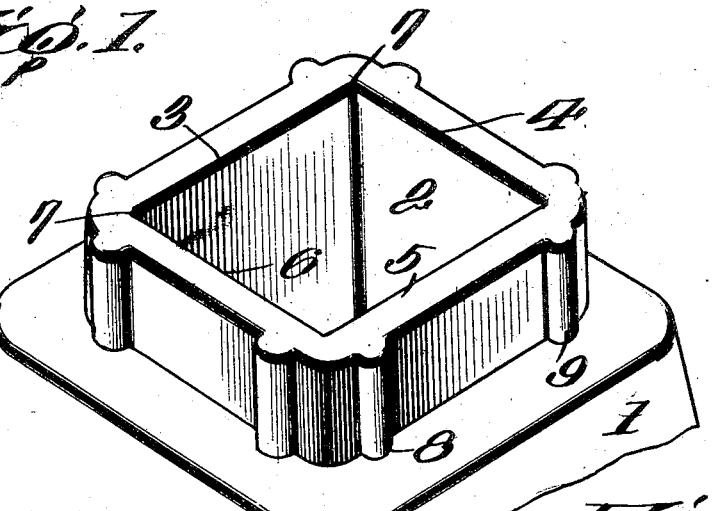
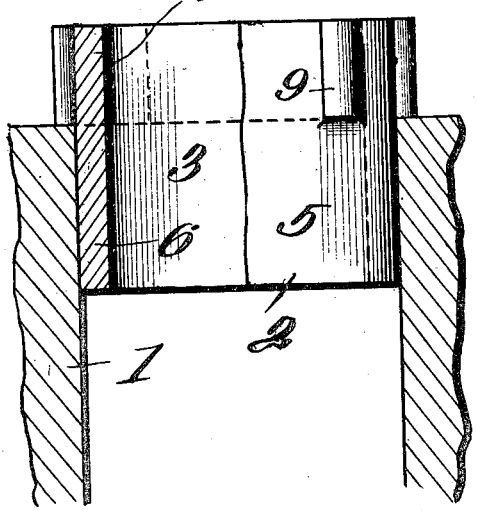
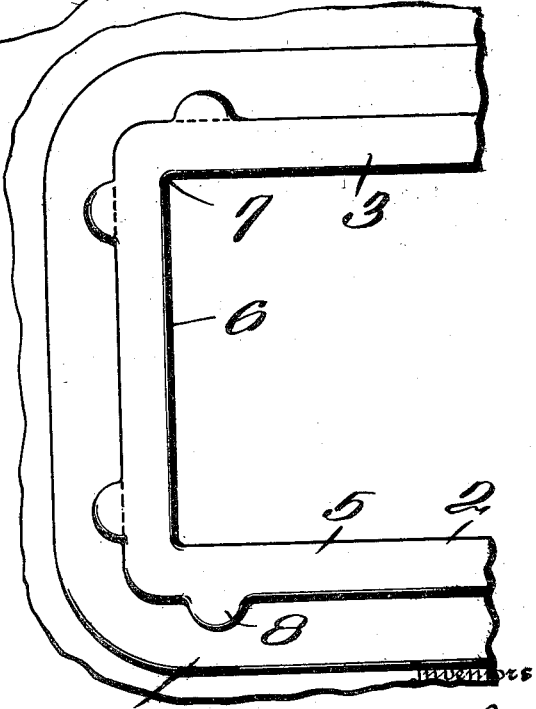

July 8, 1924.
B. H. HOWARD ET AL
FEEDER FOR INGOT MOLDS
Filed Feb. 15, 1924   2 Sheets-Sheet 2
1,500,751
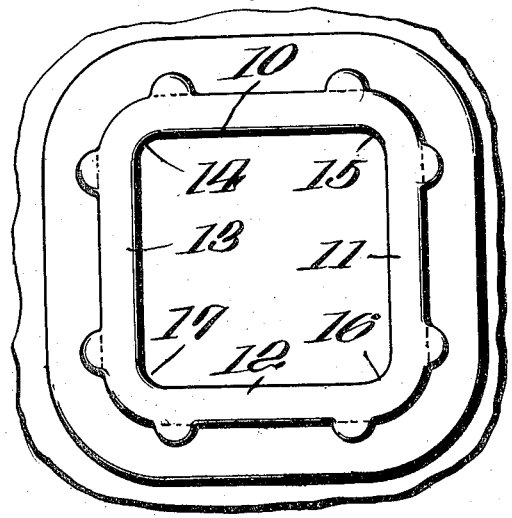
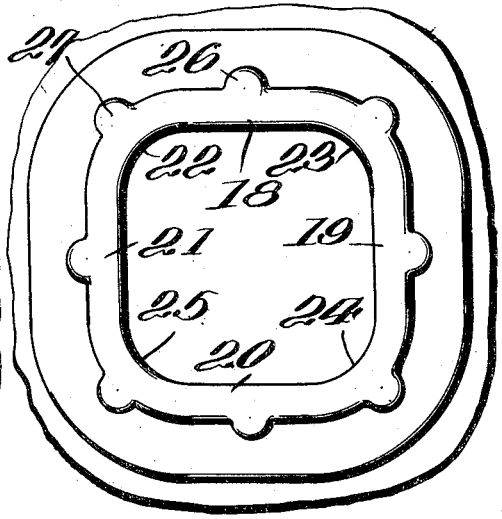
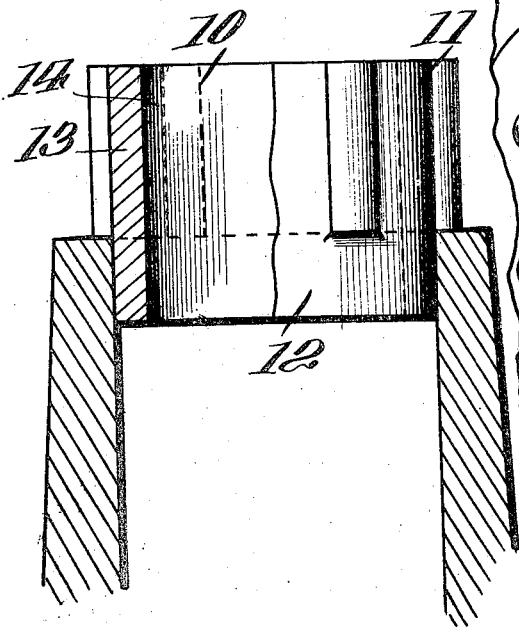
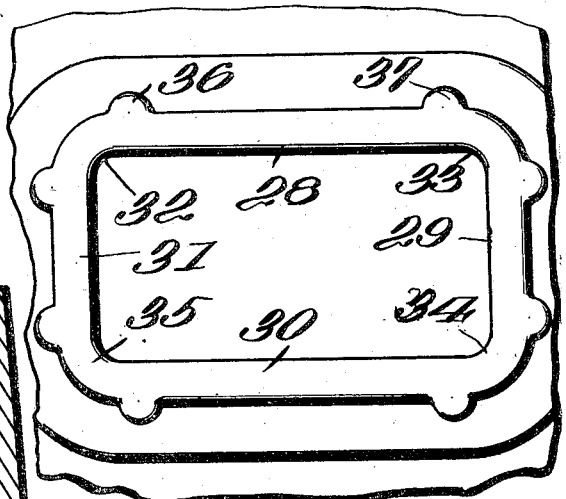
Inventors
B. H. Howard
E. J. Turner
By C. R. Wright Jr.
Attorney Patented July 8, 1924.

1,500,751

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed February 15, 1924. Serial No. 693,091.

*To all whom it may concern:*

Be it known that BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds.

The object of our invention is to provide a feeder for ingot molds to correspond with the shape of the mold whereby an ingot is formed of approximately the same shape as the article into which it is to be rolled and at the same time provide a feeder which will prevent "piping" and also reduce segregation to a minimum.

A further object of our invention is to provide a feeder in which the supporting ribs are formed as an integral part of the feeder and made semi-circular in cross section and whereby the feeder is more readily formed by the dies.

A still further object of our invention is to provide a simple, cheap and effective feeder having certain details of structure and combination of parts hereinafter more fully set forth.

In the accompanying drawings:—

Figure 1 is a perspective view of a mold showing our improved feeder applied thereto.

Figure 2 is a vertical transverse sectional view of Figure 1.

Figure 3 is an enlarged top plan view of Figure 1 partly broken away.

Figure 4 is a top plan view of a modified form of feeder in which the straight side walls are connected by semi-circular walls.

Figure 5 is a vertical transverse sectional view of Figure 4.

Figure 6 is a top plan view of a modified form of Figure 4 in which the side walls are connected by curved walls arranged in a greater arc of the circle than that shown in Figure 4.

Figure 7 is a top plan view of a rectangular feeder showing the four side walls connected by the curved walls arranged in the arc of a small circle.

Referring now to the drawings 1 represents the ingot mold and 2 the feeder which as shown is of a square form having the four flat walls 3, 4, 5 and 6 arranged and connected to form relatively sharp square corners 7. The outer faces of each wall are provided with two ribs 8 and 9 which as shown are semi-circular in cross section and adapted to form supporting means and hold the feeder on the upper end of the mold. While we have shown two of these supporting ribs on each of the four sides of the feeder it will be understood that any number of ribs can be used without departing from our invention.

In the modification shown in Figures 4 and 5 the four walls 10, 11, 12 and 13 are arranged exactly like those shown in Figures 1, 2 and 3 except that they have their ends connected by the four curved walls 14, 15, 16 and 17 thus producing an ingot having curved corners.

In Figures 6 the four walls 18, 19, 20 and 21 are arranged exactly as shown in Figure 4 and they are connected by the curved walls 22, 23, 24 and 25 arranged in an arc of a greater circle than that shown in Figure 4. In this form each side is provided with an outwardly extending semi-circular rib 26 and each corner is provided with an outwardly extending semi-circular rib 27 the same being constructed like the ribs shown in the other forms.

In Figure 7 we have shown a rectangular feeder having the four straight walls 28, 29, 30 and 31 connected by the four curved walls 32, 33, 34 and 35 arranged in the arc of a small circle. The outer face of each of the four walls is provided with two outwardly extending ribs 36 and 37 constructed the same as that shown in the other figures.

Having thus fully described our invention what we claim is:

1. A feeder for ingot molds comprising a body portion having four straight oppositely arranged walls connecting four curved walls and a supporting rib carried by each of the four straight walls and each of the four curved walls.

2. A feeder for ingot molds comprising a body portion having four straight walls and supported on top of the mold by eight ribs.

In testimony whereof we affix our signatures.

BLOOMFIELD H. HOWARD.
ERNEST J. TURNER.